(12) United States Patent
Chen et al.

(10) Patent No.: US 7,927,087 B2
(45) Date of Patent: Apr. 19, 2011

(54) METHOD AND APPARATUS FOR MOLDING WITH REDUCED CULL FORMATION

(75) Inventors: Xiang Chen, Singapore (SG); Shu Chuen Ho, Singapore (SG); Teng Hock Eric Kuah, Singapore (SG); Si Liang Lu, Singapore (SG); See Yap Ong, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 913 days.

(21) Appl. No.: 11/052,566

(22) Filed: Feb. 7, 2005

(65) Prior Publication Data

US 2006/0175734 A1    Aug. 10, 2006

(51) Int. Cl.
*B29C 45/00*    (2006.01)
(52) U.S. Cl. .................. 425/129.1; 425/544; 425/116
(58) Field of Classification Search .............. 425/544, 425/129.1, 116; 264/328.4
See application file for complete search history.

(56) References Cited

U.S. PATENT DOCUMENTS

| | | | | |
|---|---|---|---|---|
| 4,877,387 A | * | 10/1989 | Fierkens et al. | 425/116 |
| 5,478,517 A | | 12/1995 | Erdos | 264/161 |
| 5,520,874 A | | 5/1996 | Chou et al. | 264/328.4 |
| 5,741,530 A | | 4/1998 | Tsunoda | 425/116 |
| 6,068,809 A | * | 5/2000 | Chen et al. | 264/328.1 |
| 6,332,392 B1 | | 12/2001 | Telkamp et al. | 92/6 R |
| 2005/0046079 A1 | * | 3/2005 | Murugan | 264/272.17 |

FOREIGN PATENT DOCUMENTS

| | | |
|---|---|---|
| JP | 59-052634 | 3/1984 |
| JP | 60-001835 | 1/1985 |
| JP | 61-219613 | 9/1986 |
| JP | 63-021120 | 1/1988 |
| JP | 06-120278 | 4/1994 |
| JP | 06-155512 | 6/1994 |
| JP | 09-066535 | 3/1997 |
| JP | 10-258441 | 9/1998 |

OTHER PUBLICATIONS

Search Report mailed Mar. 11, 2009 in corresponding Dutch Patent Application No. 1031065.

* cited by examiner

*Primary Examiner* — Christina Johnson
*Assistant Examiner* — Larry Thrower
(74) *Attorney, Agent, or Firm* — Ostrolenk Faber LLP

(57) ABSTRACT

An apparatus and process are provided for molding electronic devices in a mold, which apparatus comprises at least one runner in the mold connected to a mold supply pot for channeling a molding compound from the mold supply pot to the electronic devices. A plunger assembly is also provided that comprises a main body, and a supplementary body configured to be movable relative to the main body. The plunger assembly is locatable in the mold supply pot and is drivable in a direction towards the runner for forcing the molding compound into the runner. In order to avoid or reduce cull formation, a width of the runner at an opening connecting the runner to the mold supply pot is smaller than a width of the main body of the plunger assembly.

13 Claims, 4 Drawing Sheets

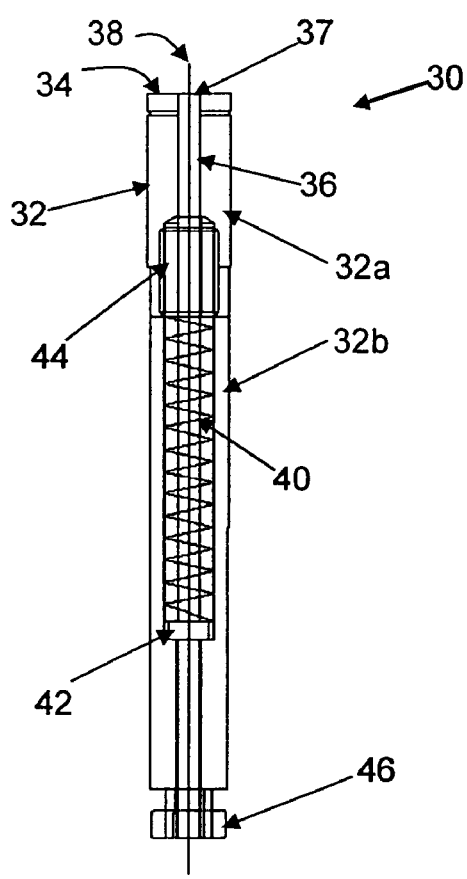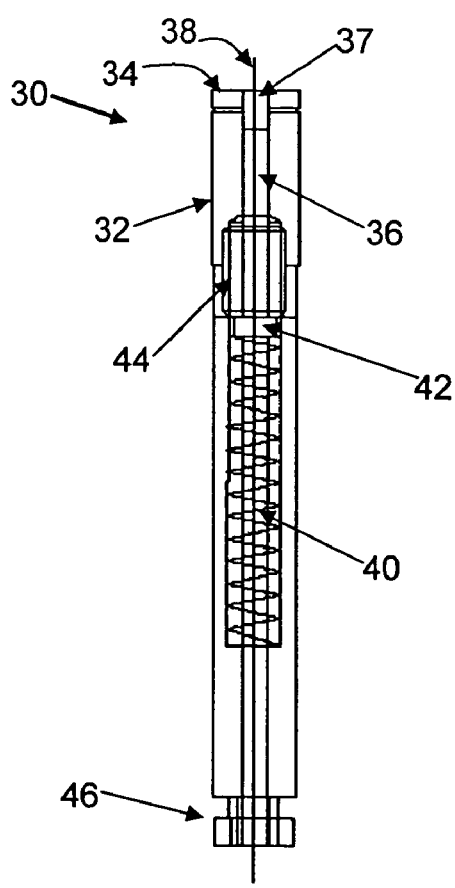
FIG. 5  FIG. 6
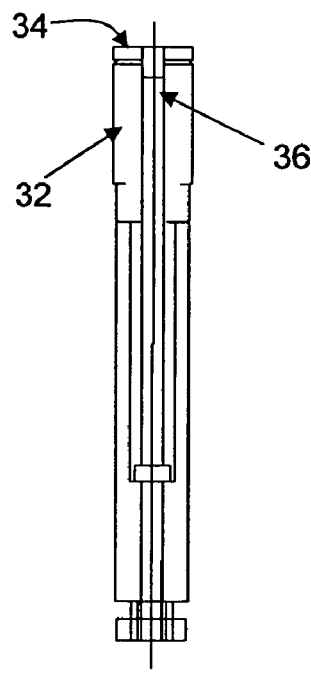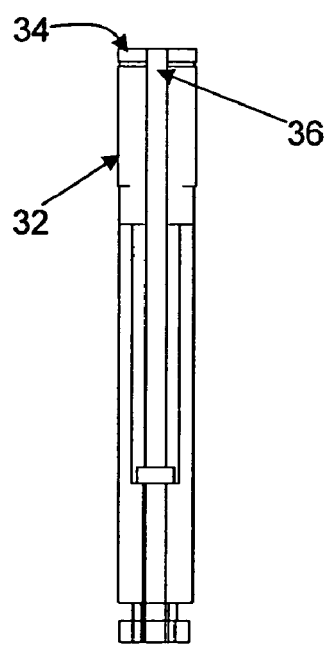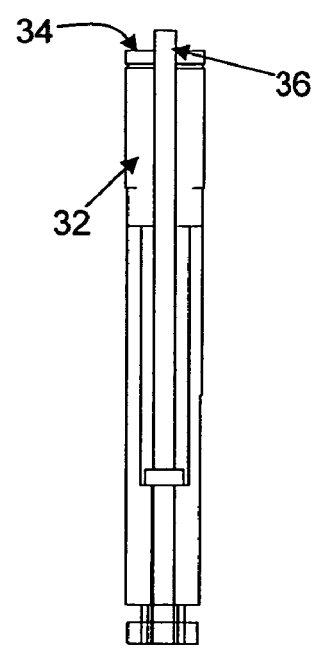
FIG. 7(a)  FIG. 7(b)  FIG. 7(c)

METHOD AND APPARATUS FOR MOLDING WITH REDUCED CULL FORMATION

FIELD OF THE INVENTION

The invention relates to a molding system for the encapsulation of semiconductor devices with molding compound.

BACKGROUND AND PRIOR ART

During the assembly of semiconductor packages, semiconductor chips are often attached onto carriers, such as substrates or leadframes. After or during attachment, electrical connections are made between electrical pads on the chips to corresponding contacts or connection pads on the substrates or leadframes. This can be done by wire bonding, or the electrical pads can be directly attached onto the contacts on the substrates or leadframes. Thereafter, it is usually necessary to protect the chips and the electrical connections by encapsulating them in an encapsulation compound, such as epoxy molding compound ("EMC").

In a typical transfer molding process, the substrate or leadframe with the chips attached is placed into a molding system comprising two mold halves. One or more molding cavities are formed in one or both of the mold halves corresponding to the positions of the chips to be encapsulated. Molding compound is introduced into mold supply pots in the molding system in pellet form. The mold supply pots are linked to the cavities through a system of runners and gates through which the molding compound is channeled before entering the cavities. A plunger is insertable into each pot under heat and pressure to crush the pellet and distribute molding compound under the pressure from the plunger through the system of runners and gates and into the molding cavities.

After the cavities have been filled, the molding compound is allowed to set. Besides molding compound that is filled into the cavities, excess molding compound is also created adjacent to the mold supply pot, and in the runners and gates. FIG. 1 is an isometric view of hardened molding compound created using a transfer molding system of the prior art, including a so-called cull portion 102. A leadframe 100 has been molded with molding compound. The hardened molding compound comprises a cull portion 102, a runner portion 104, a gate portion 106 and an encapsulation portion 108 covering the leadframe 100. The encapsulation portion 108 protects internal components (not shown) on the leadframe 100 and would be retained. The cull portion 102, runner portion 104 and gate portion 106 are not used and are removed and discarded before further processing of the leadframe 100.

Of the compound to be discarded, the cull compound 102 created is significant. Therefore, it represents significant wasted molding compound, and it is desirable that the cull compound 102 should be reduced or eliminated altogether to save costs.

FIG. 2 is a plan view of a mold chase 110 of the prior art. The mold chase 110 has recesses corresponding to the various portions of the hardened molding compound as described above. The mold chase 110 has so-called culls 112 corresponding to the cull portion 102 that is formed. The culls 112 are located adjacent to mold supply pots into which molding compound in pellet form is placed for distribution of molding compound. The culls 112 are linked via runners 114 to gates 116 leading to molding cavities 118. Molding compound is thus transferred from the culls 112 to the runners 114 and the gates 116 before being introduced into the molding cavities 118. The runners 114 correspond to the runner portion 104, the gates 116 correspond to the gate portion 106 and the molding cavities 118 correspond to the encapsulation portion 108.

This problem of cull is, for example, addressed in U.S. Pat. No. 5,520,874 entitled "Compressible Mold Plunger". It describes a plunger that has a movable piston and spring that reduces the cull space when the piston is pressed downward into the cull mold compound. It thus seeks to reduce the cull formed during molding. However, it cannot totally eliminate cull because there is still a substantial amount of molding compound that remains between the plunger and a recess in the mold chase corresponding to the position of the mold supply pot even after the plunger applies maximum pressure. The resulting hardened molding compound would still look substantially similar to that referred to in FIG. 1, as it has a large cull area. It would be advantageous to further reduce the amount of cull or eliminate cull produced by such molding process without compromising the effectiveness of the molding process.

SUMMARY OF THE INVENTION

It is therefore an object of the invention to seek to provide a molding apparatus and process that does not form or forms a reduced cull portion during molding of semiconductor devices.

According to a first aspect of the invention, there is provided an apparatus for molding electronic devices in a mold, comprising: at least one runner in the mold connected to a mold supply pot for channeling a molding compound from the mold supply pot to the electronic devices; and a plunger assembly comprising a main body and a supplementary body configured to be movable relative to the main body locatable in the mold supply pot and which is drivable in a direction towards the runner for forcing the molding compound into the runner; wherein a width of the runner at an opening connecting the runner to the mold supply pot is smaller than a width of the main body of the plunger assembly.

According to a second aspect of the invention, there is provided a method for molding electronic devices in a mold, comprising the steps of: providing a plunger assembly comprising a main body and a supplementary body configured to be movable relative to the main body; providing at least one runner in the mold connected to a mold supply pot for channeling a molding compound from the mold supply pot to the electronic devices wherein a width of the runner at an opening connecting the runner to the mold supply pot is smaller than a width of the main body; locating the plunger assembly in the mold supply pot; then driving the plunger assembly in a direction towards the runner to force the molding compound into the runner.

It would be convenient hereinafter to describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

Examples of preferred embodiments of apparatus and processes in accordance with the invention will now be described with reference to the accompanying drawings, in which:

FIG. 5 is a cross-sectional view of a first embodiment of a plunger assembly of the molding apparatus;

FIG. 6 is a cross-sectional view of a second embodiment of, a plunger assembly of the molding apparatus;

FIG. 7(a)-7(c) show possible locations of an inner plunger of the plunger assembly relative to a main plunger;

DETAILED DESCRIPTION OF THE PREFERRED EMBODIMENT

Figure 1:
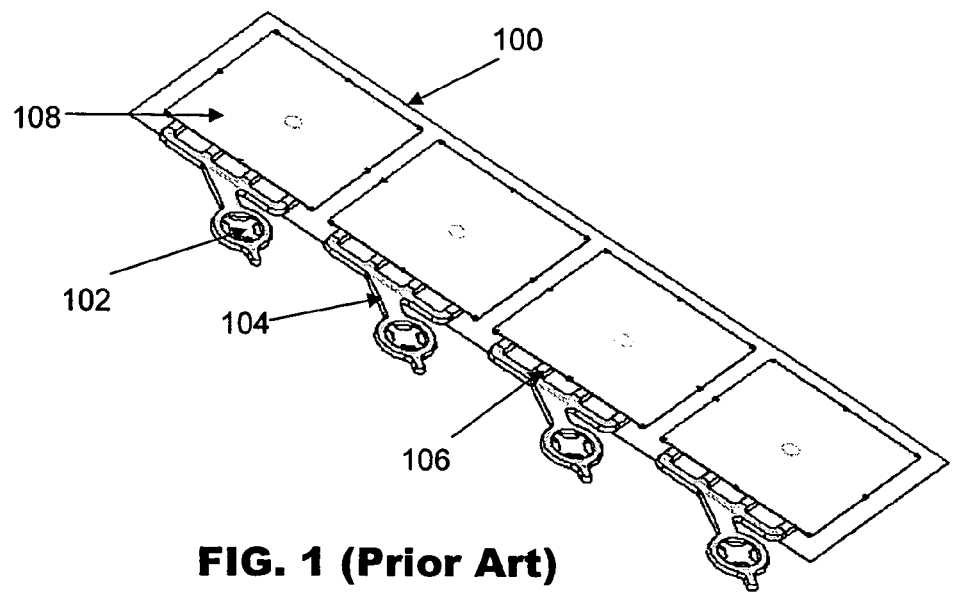
FIG. 1 is an isometric view of hardened molding compound created using a transfer molding system of the prior art, including a cull portion.
Figure 2:
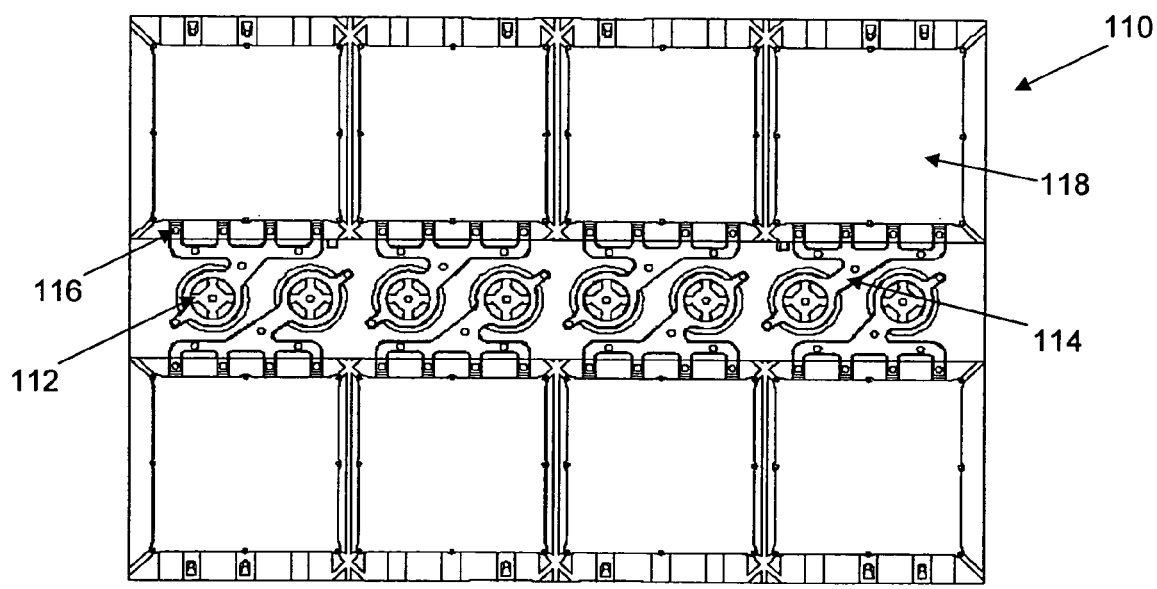
FIG. 2 is a plan view of a mold chase of the prior art.
Figure 3:
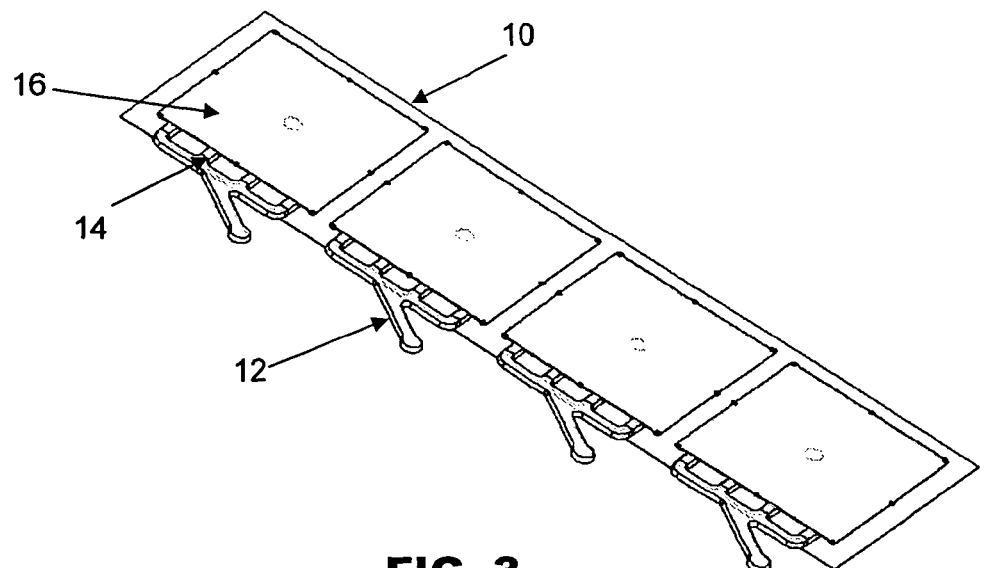
FIG. 3 is an isometric view of hardened molding compound created using a molding apparatus according to the preferred embodiment of the invention, which does not have a cull portion.

FIG. 3 is an isometric view of hardened molding compound created using a molding apparatus according to the preferred embodiment of the invention, which does not have a cull portion. A leadframe 10 has been covered with hardened molding compound. The hardened molding compound comprises a runner portion 12, a gate portion 14 and an encapsulation portion 16. The encapsulation portion 16 may cover one or both sides of the leadframe 10. Unlike the prior art, there is no cull portion. Therefore, the amount of wasted molding compound is reduced, contributing to savings in costs.

Figure 4:
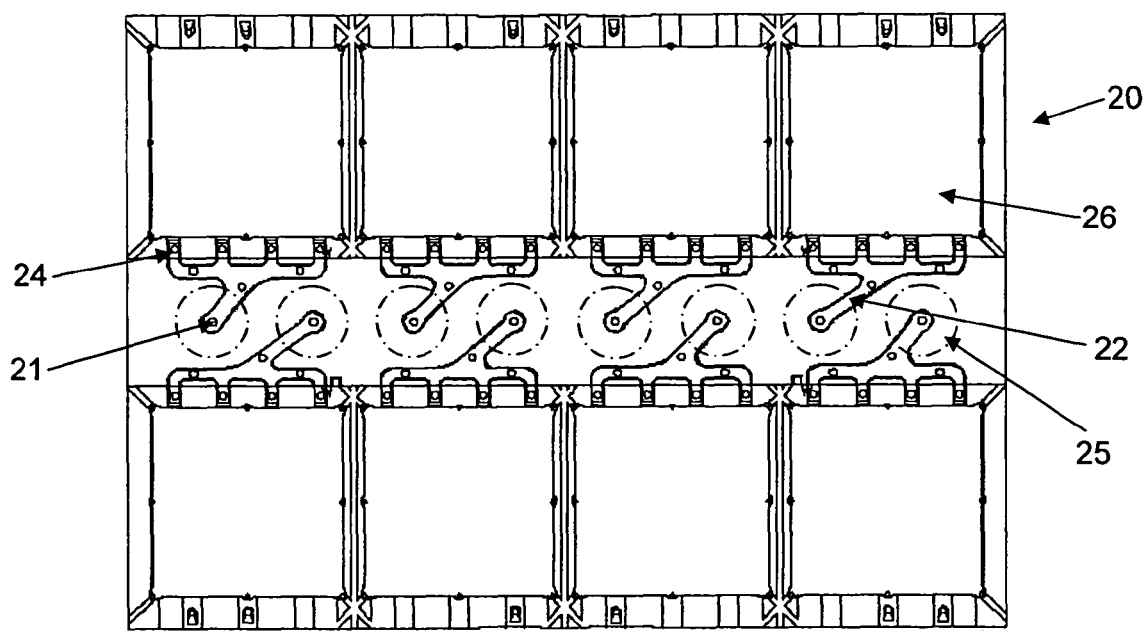
FIG. 4 is a plan view of a mold chase usable in the molding apparatus according to the preferred embodiment of the invention.

FIG. 4 is a plan view of a mold chase 20 usable in the molding apparatus according to the preferred embodiment of the invention. The mold chase 20 has recesses corresponding to the various portions of the hardened molding compound found as illustrated in FIG. 3. The mold chase 20 has runners 22 corresponding to the runner portion 12, gates 24 corresponding to the gate portion 14 and molding cavities 26 corresponding to the encapsulation portions 16. There is no cull in the mold chase 20, so as to reduce wastage of molding compound.

At least one runner 22 is connected to each mold supply pot 25 located adjacent to the runner 22. Each runner 22 channels molding compound from the mold supply pot 25 to the electronic device(s) placed in the mold for molding. A width of the runner 22 at an opening 21 at the end of the runner connecting the runner 22 to the mold supply pot 25 is smaller than the width of the mold supply pot 25, and thus smaller than a width of a plunger assembly 30 that is inserted into the mold supply pot 25. In comparison, the widths at the ends of prior art runners are larger than the widths of plunger assemblies, resulting in the formation of cull portions.

FIG. 5 is a cross-sectional view of a first embodiment of a plunger assembly 30 of the molding apparatus. The plunger assembly 30 comprises a main body or main plunger 32, which may be shaped and sized externally like a conventional plunger of the prior art. The main plunger 32 has a top surface 34 that is configured to crush and to apply pressure on a pellet of molding compound in the mold supply pot 25 to force the molding compound into the runners 22, gates 24 and molding cavities 26. The plunger assembly 30 has a hole 37 that is aligned with a central axis 38 of the plunger assembly 30. Preferably, the hole 37 extends throughout the length of the main plunger 32.

A major innovation in the preferred embodiment is a supplementary body or inner plunger 36 located in the hole 37. The inner plunger 36 is movable relative to the main plunger 32 along the hole 37, and in one preferred embodiment of the invention, is drivable to travel beyond the top surface 34 as well as be retracted behind the top surface 34. Nevertheless, whether the inner plunger 36 is adapted to travel beyond the top surface 34 of the main plunger 32 is not generally material to the functioning of the invention, although it may be a means for controlling the molding pressure or molding sequence.

Preferably, a biasing element such as a spring 40 is located in the main plunger 32 to provide a biasing force to the inner plunger 36 in a desired direction. In this first embodiment of the invention, one end of the spring 40 is biased against a spring flange 42 located in the body of the inner plunger 36 such that the biasing force biases the inner plunger 36 in a direction away from the runner 22, and therefore tends to retract the inner plunger 36 behind the top surface 34. The spring flange 42 acts as a stopper and a reaction force from the spring 40 acts on it when the inner plunger 36 is moved upwards. An opposite end of the spring 40 may be arranged against a holding nut 44. The holding nut 44 is used to hold together two separable components 32a, 32b of the main plunger 32. It is preferable that the main plunger 32 is comprised of separable components so that internal parts such as the inner plunger 36 and spring 40 can be more easily assembled. Preferably, the main plunger 32 receives the inner plunger 36 into it only when the separable components 32a, 32b are disassembled. A locking flange 46 is formed at the bottom of the main plunger 32 for attachment to a plunger holder (see below).

In this first embodiment of the invention as shown in FIG. 4, the molding apparatus includes an actuator that is adapted to provide an active external force against the inner plunger 36 for the inner plunger 36 to apply active pressure onto the molding compound. Referring to FIG. 4, the inner plunger 36 should be located in the mold supply pot 25 adjacent an opening 21 at the end of the runner 22 that is remote from the gates 24 and molding cavities 26. A diameter or width of the inner plunger 36 should preferably correspond substantially to a width of the runner 22 at the opening 21. More preferably, the diameter or width of the inner plunger 36 is slightly smaller than the width of the runner 22 at the opening 21 such as to be insertable into the runner 22.

In operation, the plunger assembly 30 is first moved upwards so that the top surface 34 crushes and compresses a pellet of molding compound on the mold supply pot 25. The plunger assembly 30 is forced upwards until the top surface 34 comes into contact with a surface of the mold chase 20. Meanwhile, molding compound is forced into the runners 22, gates 24 and molding cavities 26. If the inner plunger 36 is retracted from the top surface 34 during such compression, some molding compound will be forced into the hole 37. When the main plunger 32 cannot move any more, the inner plunger 36 will be driven to move upwards and force molding compound out of the hole 37 and into the runner 22. Alternatively, the inner plunger 36 may be configured to extend out of the top surface 34 and into the runner 22. As a result, no cull portion 102 is produced in the final hardened molded compound using the apparatus.

FIG. 6 is a cross-sectional view of a second embodiment of a plunger assembly 30 of the molding apparatus. In this embodiment, one end of the biasing element in the form of a spring 40 is arranged against the main plunger 32 and an opposite end of the spring 40 is biased against the spring flange 42. Here, the spring flange 42 is located higher up on the inner plunger 36, near to the holding nut 44. The difference in functionality as compared to the first embodiment is that the spring 40 provides a preloaded biasing force against the spring flange 42 to exert a pressure on the inner plunger 36 in the direction towards the runner 22 against the molding compound. With this modification to provide a preloaded biasing force, an active force introduced externally of the plunger assembly 30 is not necessary.

An operation of the second embodiment is now described. The plunger assembly 30 is first moved upwards so that the top surface 34 compresses a pellet of molding compound in the mold supply pot 25. The plunger assembly 30 is forced upwards until the top surface 34 comes into contact with a surface of the mold chase 20. Meanwhile, molding compound is forced into the runners 22, gates 24 and molding cavities 26. If the inner plunger 36 is flush with the top surface 34, some molding compound may tend to be forced into the hole 37 due to a reaction force produced by the molding compound being compressed. However, this reaction force is counter-balanced by the preloaded biasing force from the spring 40 acting on the spring flange 42 of the inner plunger 36. Typically, it is expected that some molding compound would tend to flow into the hole 37 under this arrangement, but the amount of flow is controllable.

After the molding compound has hardened and when the plunger assembly is being retracted from the surface of the mold chase 20, the preloaded biasing force exerted by the spring 40 on the inner plunger 36 causes relative movement between the inner plunger 36 and the main plunger 32. This relative movement helps to eject molding compound from the hole 37 so as to facilitate the sliding of hardened molding compound against an inner surface of the hole 37. This is to avoid hardened molding compound being severed and left in the hole 37, thereby necessitating manual cleaning of the hole 37 and interruption to an automated molding process.

FIG. 7(a)-7(c) show possible locations of an inner plunger 36 of the plunger assembly 30 relative to a main plunger 32. These are typically positions of the inner plunger 36 when the main plunger 32 is being driven in the direction towards the runner 22. In FIG. 7(a), the inner plunger 36 is configured to be retracted from the end or top surface 34 of the main plunger 32, so that molding compound is allowed to flow into the hole 37 of the main plunger 32 during initial movement of the main plunger 32 to compress a molding compound. This process is described above in relation to the first embodiment above. In FIG. 7(b), the inner plunger 36 is configured to be flush with the end or top surface 34 of the main plunger 32. If an active force is exerted on the inner plunger 36 as described in the first embodiment of the plunger assembly 30, no hardened molding compound is allowed into the hole 37. In FIG. 7(c), the inner plunger 36 is configured to be extended beyond the end or top surface 34. In this case, the inner plunger 36 would be designed to intrude into the opening 21 at the end of the runner 22 when the top surface 34 of the main plunger 32 contacts the surface of the mold chase 20. Thus, further extension of the inner plunger 36 by driving it into the opening 21 may be unnecessary.

Figure 8:
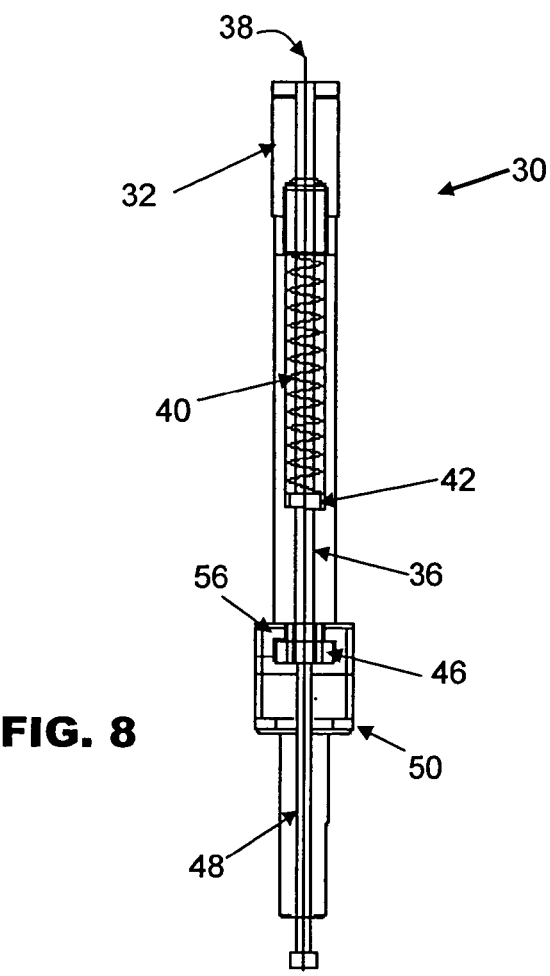
FIG. 8 is a cross-sectional view of the plunger assembly held in a plunger holder.

FIG. 8 is a cross-sectional view of the plunger assembly 30 of the first embodiment described above held in a plunger holder 50. The locking flange 46 of the plunger assembly 30 is engaged within receptacle flanges 56 of the plunger holder 50 so that the plunger assembly 30 and plunger holder 50 are locked to each other. An actuator, preferably a push rod 48, is located on the central axis 38, and is coupled to the plunger holder 50. It is configured to be movable relative to the plunger holder 50. The inner plunger 36 is accessible to the push rod 48 via a base of the main plunger 32. Therefore, the push rod 48 is configured to be extendable out of the top of the plunger holder 50 to engage and push the bottom of the inner plunger 36, whereby to apply a molding force on the inner plunger 36 against the molding compound.

Figure 9:
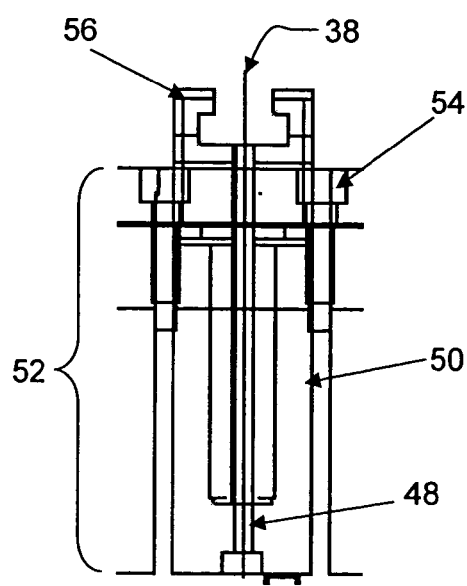
FIG. 9 is a cross-sectional view of a first embodiment of the plunger holder of the molding system.

FIG. 9 is a cross-sectional view of a first embodiment of the plunger holder 50 of the molding system. The plunger holder 50 is preferably mounted on a pusher assembly in the form of a plunger block 52 by way of mounting screws 54. Receptacle flanges 56 at the top of the plunger holder 50 serve to cooperate with a locking flange 46 of the plunger assembly 30 to lock the plunger assembly 30 to the plunger holder 50. A base of the pusher assembly or plunger block 52 is preferably designed to be movable together with the push rod 48 so that the plunger block 52 is operative to apply a force to move the push rod 48 relative to the main body of the plunger holder 50. In turn, the push rod 48 engages and pushes the inner plunger 36 upwards.

In operation, the plunger block 52 is first moved upwards so that the plunger holder 50 and plunger assembly 30 connected to it are moved in tandem towards a surface of the mold chase 20. Once the top surface of the main plunger 32 contacts the surface of the mold chase 20, movement of the main plunger 32 and plunger holder 50 is obstructed. They cannot move further upwards and will remain stationary. Further upwards force acting on the plunger block 52 will move the base of the plunger block 52 towards the plunger holder 50, and the base of the plunger block 52 will engage the push rod 48. This pushes the push rod 48 upwards, which in turn pushes the inner plunger 36 against the molding compound to apply a further compression force onto the molding compound. Once the molding compound hardens and the plunger assembly is to be retracted from the mold chase 20, the plunger block 52 is moved downwards, which in turn moves the plunger holder 50 and plunger assembly 30 downwards in tandem with it.

Figure 10:
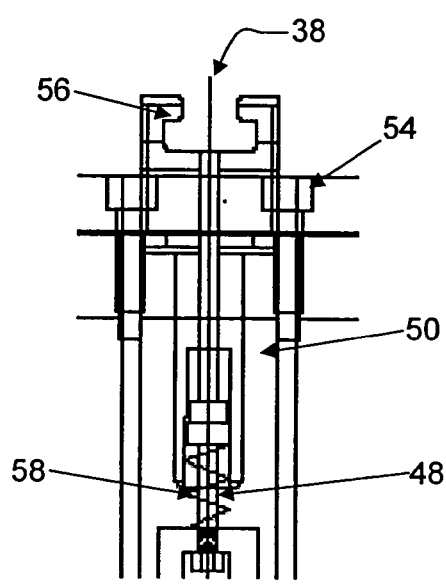
FIG. 10 is a cross-sectional view of a second embodiment of the plunger holder.

FIG. 10 is a cross-sectional view of a second embodiment of the plunger holder 50. The main difference of the second embodiment as compared to the first embodiment is the inclusion of a resilient member such as a push rod spring 58 that provides a compensation force on the push rod 48 against the base of the plunger block 52. This compensation force is useful to compensate for pellet weight variation and to even out unequal force distribution when a few plunger holders and plunger assemblies are interconnected and used as a single entity.

It would be appreciated that wastage of molding compound is reduced by avoiding the creation of a cull portion during molding using the preferred embodiments of the invention. It is estimated that the saving with respect to the molding of Quad Flat No-Lead ("QFN") packages amounts to about a 15% reduction in total molding compound consumption per mold shot. Correspondingly, a lower volume of molding compound may be introduced to the molding system per shot as compared to conventional molding systems.

Another benefit of the preferred embodiments is that the dimensions of the plunger assembly as a whole corresponds to that of traditional plungers. Therefore minimal modifications are required to conventional molding systems. Further, with the described apparatus, the plunger assembly may be used without further modification if smaller pellet sizes are used, say pellets from 4 to 8 mm in diameter.

It should also be appreciated that although the above description refers to upward motion of the plunger assembly and connected components during compression, the invention is also application with suitable modification where the molding system is arranged such that the plunger assembly moves in other directions, such as downwards, to compress the pellet.

The invention described herein is susceptible to variations, modifications and/or additions other than those specifically described and it is to be understood that the invention includes all such variations, modifications and/or additions which fall within the spirit and scope of the above description.

The invention claimed is:

1. Apparatus for molding electronic devices in a mold, the apparatus comprising:
   a mold supply pot positionable on a surface of the mold during molding and configured for holding a molding compound;
   at least one runner extending along the surface of the mold and positioned in a feeding direction, the runner having an opening, the runner being connected to the mold supply pot through the opening for channeling the molding compound from the mold supply pot to the electronic devices in the mold;
   a plunger assembly comprising a main body configured to be positioned in the mold supply pot, the main body of the plunger assembly having a contact surface at one end thereof, the contact surface being configured to project in a plunging direction perpendicular to the feeding direction until the contact surface comes into contact with the surface of the mold during molding and expels molding compound from the mold supply pot, the plunger assembly further comprising a supplementary body which is movable relative to the main body and is configured to be driven in the plunging direction towards the runner after the contact surface has come into contact with the surface of the mold for further forcing the molding compound from the mold supply pot into the runner; and
   a single plunger block coupled to the plunger assembly, the single plunger block including a push rod and the single plunger block being configured to drive the main body and the supplementary body, and the single plunger block being also configured to engage the supplementary body via the push rod and to separately drive the supplementary body via the push rod to move relative to the main body when movement of the main body is obstructed;
   wherein a width of the runner measured across the mold supply pot at a position along the opening of the runner is smaller than a corresponding width of the main body of the plunger assembly.

2. Apparatus as claimed in claim 1, including a biasing element provided between the supplementary body and the main body for biasing the supplementary body in the direction towards the runner.

3. Apparatus as claimed in claim 1, including a biasing element positioned between the supplementary body and the main body, the biasing element being configured to bias the supplementary body in a direction away from the runner.

4. Apparatus as claimed in claim 1, wherein the supplementary body is accessible to the push rod via a base of the main body.

5. Apparatus as claimed in claim 1, including a holder configured to hold the plunger assembly and to couple the plunger block to the plunger assembly, the plunger block being movable with respect to the holder.

6. Apparatus as claimed in claim 5, wherein the single plunger block is configured to move the holder and the plunger assembly in the direction towards the runner, the single plunger block being configured to move the push rod relative to the holder in the direction towards the runner when movement of the holder and the plunger assembly towards the runner is obstructed by a portion of the mold.

7. Apparatus as claimed in claim 6, including a resilient member between the single plunger block and the push rod for providing a compensation force on the push rod against the single plunger block.

8. Apparatus as claimed in claim 1, wherein the supplementary body is located in a hole extending throughout a length of the main body.

9. Apparatus as claimed in claim 1, wherein a width of the supplementary body corresponds substantially to the width of the runner measured across the mold supply pot at the position of the opening.

10. Apparatus as claimed in claim 1, wherein the width of the supplementary body is smaller than the width of the runner measured across the mold supply pot at the position of the opening to allow the supplementary body to be insertable into the runner.

11. Apparatus as claimed in claim 1, wherein the supplementary body is configured to be flush with an end of the main body facing the runner when the main body is driven in the direction towards the runner.

12. Apparatus as claimed in claim 1, wherein the supplementary body is configured to be retracted from an end of the main body facing the runner when the main body is driven in the direction towards the runner.

13. Apparatus as claimed in claim 1, wherein the main body comprises separable components configured to receive the supplementary body into the main body only when the separable components are disassembled.

* * * * *